United States Patent
Pizzato

(10) Patent No.: US 11,480,937 B2
(45) Date of Patent: Oct. 25, 2022

(54) SAFETY SWITCH WITH DIFFERENTIATED CPU

(71) Applicant: PIZZATO ELETTRICA S.R.L., Marostica (IT)

(72) Inventor: Marco Pizzato, Marostica (IT)

(73) Assignee: PIZZATO ELETTRICA S.R.L., Marostica (IT)

( * ) Notice: Subject to any disclaimer, the term of this patent is extended or adjusted under 35 U.S.C. 154(b) by 549 days.

(21) Appl. No.: 16/462,557

(22) PCT Filed: Nov. 21, 2017

(86) PCT No.: PCT/IB2017/057277
§ 371 (c)(1),
(2) Date: May 21, 2019

(87) PCT Pub. No.: WO2018/092108
PCT Pub. Date: May 24, 2018

(65) Prior Publication Data
US 2020/0081409 A1 Mar. 12, 2020

(30) Foreign Application Priority Data
Nov. 21, 2016 (IT) .......................... 102016000117298

(51) Int. Cl.
*G05B 19/042* (2006.01)

(52) U.S. Cl.
CPC .................. *G05B 19/0428* (2013.01); *G05B 2219/24008* (2013.01)

(58) Field of Classification Search
CPC ...... G05B 19/0428; G05B 2219/24008; H01H 27/002; H01H 3/161
See application file for complete search history.

(56) References Cited

U.S. PATENT DOCUMENTS 5,227,981 A * 7/1993 Katsuki ............... G06F 11/1441
62/158
7,308,337 B2 * 12/2007 Sparenborg ............. B66C 13/48
212/273

(Continued)

FOREIGN PATENT DOCUMENTS

| CN | 203248973 U | * | 10/2013 | |
| JP | 57130130 A | * | 8/1982 | ............... G06F 1/26 |
| JP | 2005025479 A | * | 1/2005 | |

*Primary Examiner* — Thomas C Lee
*Assistant Examiner* — Michael Tang
(74) *Attorney, Agent, or Firm* — Mark M. Friedman

(57) ABSTRACT

A safety switch with differentiated CPUs comprises a switching device (2) associated with a fixed part of an access to be controlled and having switching means connected to one or more circuits of the system for the opening/closing thereof, a driving device (3) associated to a movable part of the access to interact with the switching means for opening/closing of one or more circuits, control means (6) associated with the switching device (2) and adapted to receive input signals from the circuits through respective communication buses for sending an error signal and/or for stopping the system in case of no signal or detection of non-compliance, wherein the control means (6) comprise a main CPU (7) connected with the communication buses (9) associated with safety functions and at least one auxiliary CPU (8) connected solely to the communication buses (12) associated with circuits and/or devices not related to safety conditions.

8 Claims, 3 Drawing Sheets

(56) References Cited

U.S. PATENT DOCUMENTS

2012/0297681 A1* 11/2012 Krupke ................ F16B 7/0433
                                                              49/324
2014/0300412 A1* 10/2014 Pizzato ................ H03K 17/60
                                                              327/574
2015/0029033 A1*  1/2015 Pizzato .............. E05D 11/0081
                                                              340/815.4
2017/0123396 A1*  5/2017 Papenbreer .......... G05B 19/048
2017/0212490 A1*  7/2017 Hellmann ......... H04L 12/40019
2017/0242417 A1*  8/2017 Quaas ................ G05B 19/048
2018/0024522 A1*  1/2018 Veryha ................ G05B 19/058
                                                              700/79

* cited by examiner

SAFETY SWITCH WITH DIFFERENTIATED CPU

TECHNICAL FIELD

The present invention finds application in the field of electrical devices for industrial use and has particularly for object a safety switch with differentiated CPUs designed to guard an access to a machine or industrial plant.

STATE OF THE ART

As known, the switches designed to guard access to industrial machines or plants, such as protection panels, barriers, safety perimeters, comprise a switching device suitable for being anchored to the fixed part of the access and a driving device adapted to be anchored to the movable part.

In known manner, when the movable part is closed, the interaction between the switching device and the driving device is determined, making it possible to start the machine or plant, unless there are conditions that require the specific intervention of an operator.

By contrast, the opening of the access and the consequent removal of the driving device from the switching device produce the immediate shutdown of the machine or plant in order to allow access to it in safe conditions.

The switching device is also provided with electronic control means to verify that all the safety conditions are respected and to block the machine or plant in case one or more of the safety conditions are not respected.

In particular, the control means comprise a CPU connected to the various communication buses to receive respective information regarding the opening or closing of the access and the correct operation of the various parts of the system, as described for example in EP2850628.

EP2748926 discloses an electronically operated switch with a Tag/RFID identification system, wherein the driving device communicates with the switching device by sending to the latter a remote signal provided with an identification code.

The CPU provides to receive this code and to compare it with a code stored in the memory, authorizing the system to start only if the recognition is positive.

The CPU also manages all communications with the signal buses that handle information not related to safety conditions, usually providing the system shutdown even if it should encounter errors in one of the functions not related to safety conditions.

To increase the safety of the switch, the control means are usually provided with two CPUs, organized according to a master/slave architecture but which in any case substantially perform the same functions in a redundant manner.

The two CPUs communicate with each other in such a way as to check each other for correct operation and to order the system shutdown in the event of malfunction of the other CPU.

The main drawback of these known solutions is due precisely to the fact that the CPU, or the two redundant CPUs, handle both functions related to safety conditions and functions not associated with safety conditions.

This aspect implies that in the moment in which it is necessary to reconfigure one or more functions of the CPU not related to safety conditions, since the intervention is carried out on a component that also manages functions related to safety conditions, the legislation provides that it is necessary to proceed to a new component certification, with a consequent increase in costs and times.

Scope of the Invention

The object of the present invention is to overcome the above drawbacks by providing a safety switch with differentiated CPUs which has features of high efficiency and relative cost-effectiveness.

A particular object is to realize a safety switch with differentiated CPUs that allows to reconfigure the functions not related to safety conditions without having to proceed with a new certification of the CPU.

Another object is to provide a safety switch with differentiated CPUs that avoids having to reprogram the CPU assigned to the safety checks even when modifying parameters related to functions that do not require safety conditions.

These objects, as well as others that will become more apparent hereinafter, are achieved by a safety switch with differentiated CPUs suitable for guarding a safety access to a machine or industrial plant which, according to claim 1, comprises a switching device which can be associated with a fixed part of the access to be controlled and having switching means adapted to be operatively connected to one or more control and/or service circuits of the system for opening/closing thereof, a driving device associable to a movable part of the access to interact with said switching means upon opening/closing of the access for opening/closing one or more of said circuits; control means associated with said switching device and adapted to receive input signals from said control and/or service circuits by means of respective communication channels to verify correct operation thereof and to control said switching means to send an error and/or system shutdown signal in case of absence of signal or upon detection of non-conformity.

The control means comprise at least one main CPU operatively connected to the communication channels associated with safety functions of the plant and at least one auxiliary CPU operatively connected exclusively to the communication channels associated with service circuits not related to plant safety conditions.

Thanks to this combination of features when you need to reconfigure the switch to change one or more auxiliary functions not related to safety conditions, for example to adapt to the specific needs of the user, you will not need to intervene on the main CPU assigned to the safety control.

As a result, the main CPU will not need to be reprogrammed and therefore will not need to be re-certified.

At the same time the auxiliary CPU, not being entrusted with security checks, will not require certification in case of reprogramming, allowing savings in terms of costs and time. Suitably, the auxiliary CPU may comprise a memory portion for storing data relating to the operation of the monitored circuits and to be associated with an accumulator connected to charging means that can be activated when the system is turned off.

Moreover, the charging means may comprise a diode adapted to charge said accumulator with a charge sufficient to said auxiliary CPU to save the operating data in said memory portion.

In this way, when the switch is switched off, the auxiliary CPU will have enough time to backup and memorize the information about the status of the circuits controlled at the time of power-off, in order to facilitate the correct restart of the system.

Advantageous embodiments of the invention are obtained according to the dependent claims.

BRIEF DISCLOSURE OF THE DRAWINGS

Further features and advantages of the invention will become clearer in the light of the detailed description of a preferred but not exclusive embodiment of a safety switch according to the invention, illustrated as a non-limiting example with the aid of the attached drawings wherein.

Figure 3:
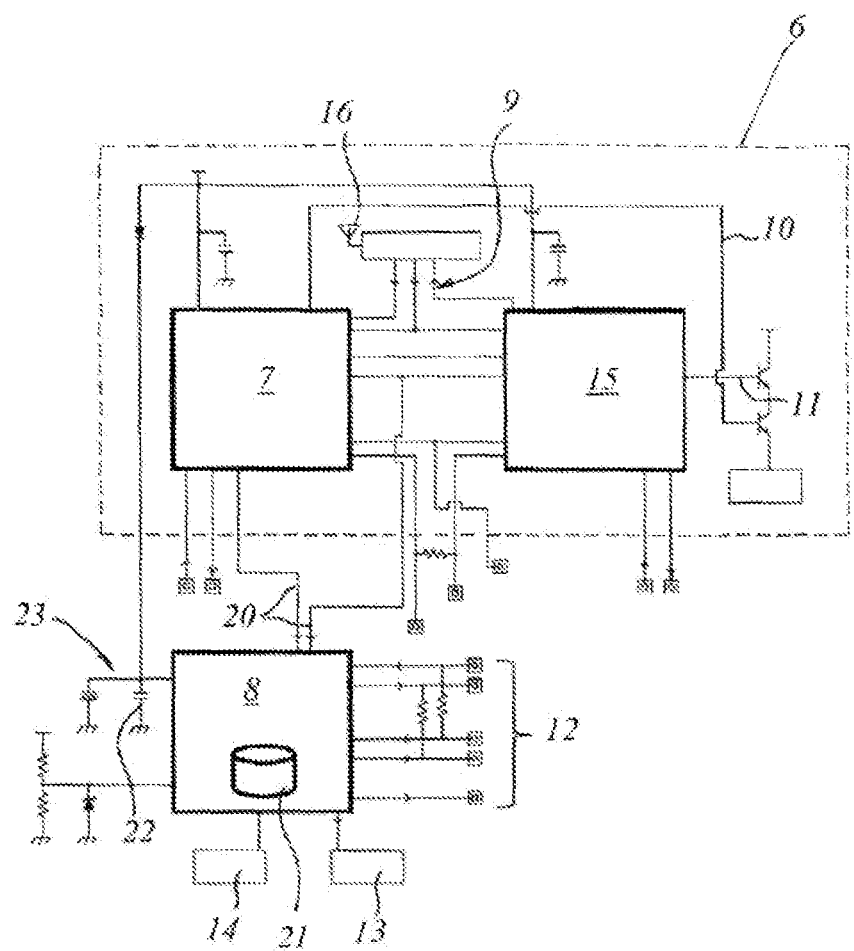

FIG. 3 schematically shows the control means of a switch of the invention.

BEST MODE OF CARRYING OUT THE INVENTION

With reference to the attached figures, a preferred but non-exclusive configuration of a safety switch according to the invention is shown, which will generally be designed to guard an access to a machine or industrial plant.

Figure 1:
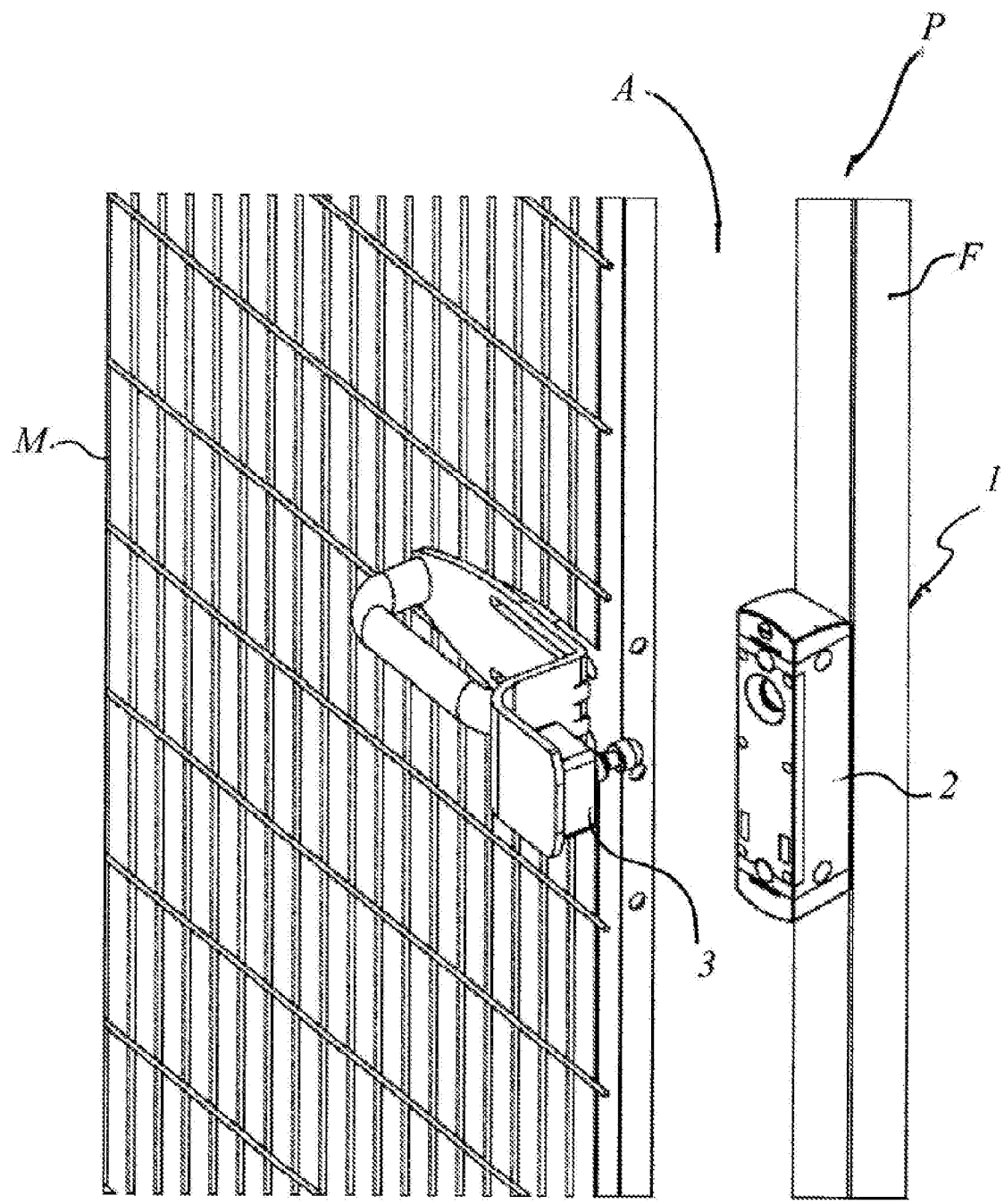
FIG. 1 is a perspective view of the switch of the invention.

As shown in FIG. 1, the switch, indicated globally by 1, will be designed to be applied, in a preferred but not exclusive manner, to a protection P of the barrier or mobile panel type designed to prevent unsafe access to a machine or industrial plant in action.

In a known manner, the switch 1 will be designed to be applied to the protection P at an access A thereof in order to interrupt the operation of the machine or plant in an immediate or timed manner in the event of a request to open the access A.

The opening of the access A may be of any type, both hinged and sliding, and still with opening to the right or left, without particular limitations.

In the illustrated configuration, the switch 1 is of the electronically actuated type, that is, provided with a remote communication system between the switching part and the driving part, as described more clearly below.

However, according to an alternative configuration not shown, the switch may also be mechanically or electromechanically operated with a key actuator.

In its most essential form, the switch 1 comprises a switching device 2 adapted to be anchored to a fixed part F of the access A to be controlled and a driving device 3 adapted to be anchored to the movable part M of the access A.

The anchoring methods of the switching device 2 and of the driving device 3 to the respective parts F, M of the access A are of known type and do not form part of the present invention, so that they will not be described in more detail below.

The switching device 2 comprises a case 4 housing inside switching means, not visible in the figures but with a configuration known per se, adapted to be operatively connected to one or more electric and/or electronic circuits for power supply and/or control the main circuit and/or service and emergency circuits of the system.

The switching means may be selected from those commonly used in the sector and may also vary according to the functionality of the switch 1, without particular limitations.

The methods of connection of the switching means will be selected among those typical for this type of product and will also not be described in more detail below.

Figure 2:
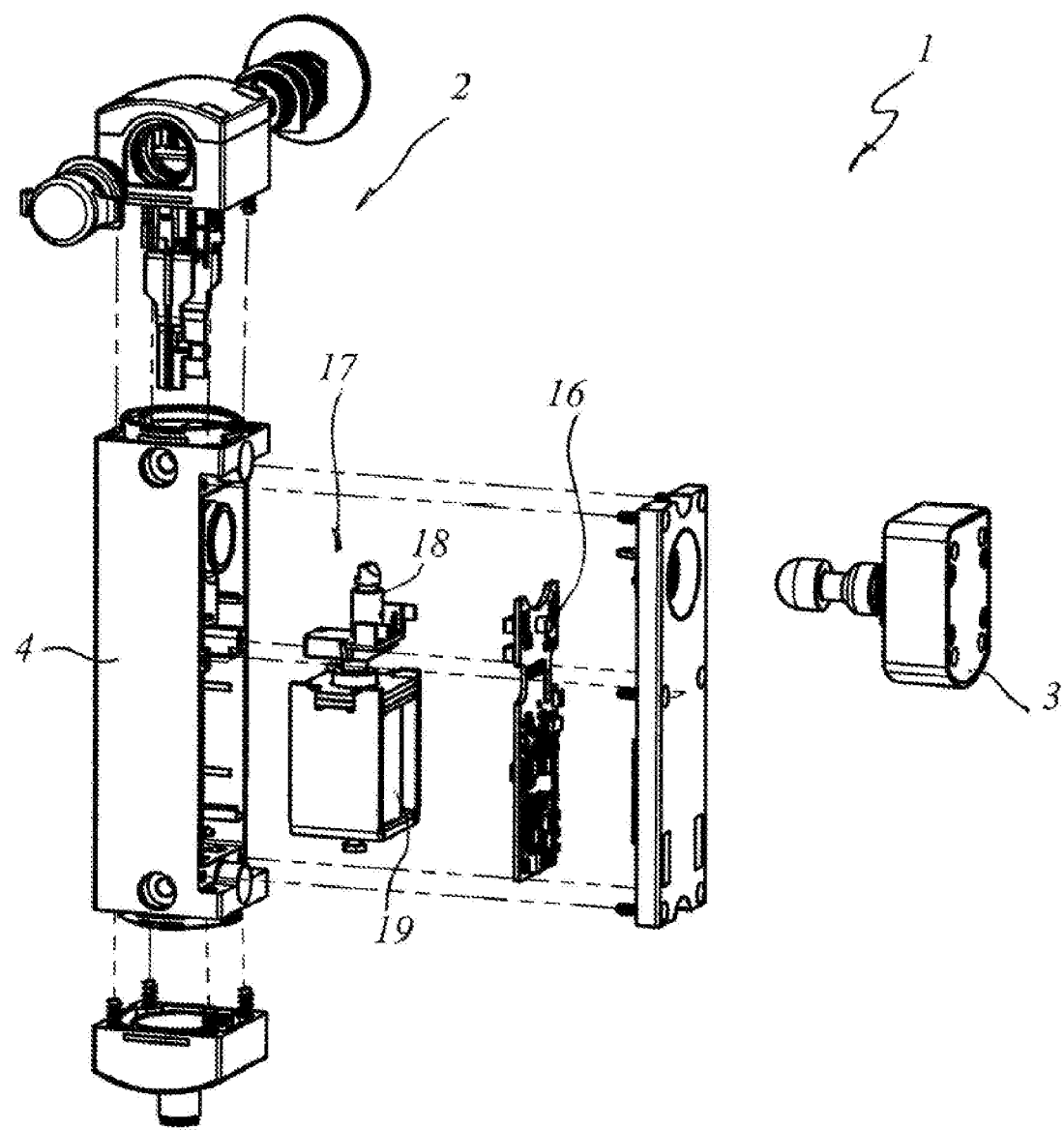
FIG. 2 is an exploded perspective view of the switch of FIG. 1.

The case also houses control means 6, as shown in FIG. 2, which are adapted to receive input signals from the control and/or service circuits by means of respective communication channels to verify correct operation thereof.

In this way, the control means 6 may control the switching means to send an error signal and/or provide for the system shutdown in the absence of a communication signal from one of the communication channels or in case of non-conformity detection.

In FIG. 3 a preferred but non-exclusive configuration of the control means 6 is schematically shown, from which it can be observed that the control means comprise a main CPU 7 operatively connected to the communication channels associated with safety functions of the plant and an auxiliary CPU 8 operatively connected exclusively to the communication channels associated with service circuits not related to plant safety conditions.

In particular, the main CPU 7 will be connected to the communication channels 9 that transmit information about the correct closure of access A, to the communication channels used to send information on the correct operation of the switching means and any possible means of block/unlock, as specified in more detail below, and to the control channels of the safety outputs 10, 11.

In turn, the auxiliary CPU 8 is associated with the communication channels 12 adapted to transport information relating to the operation of secondary devices, such as signal lights 13 and other auxiliary devices 14, whose possible malfunction could not however jeopardize the safe operation of the plant.

Appropriately, the main CPU 7 will not be connected to communication channels associated with functions that are not safety functions, so that there is no need to reprogram it, and at the same time the secondary CPU 8 will not be associated with safety functions but exclusively non-safety functions, so that in case of reprogramming it will not have to be re-certified.

The auxiliary CPU 8 will in any case be connected to the main CPU 7 to send thereto information related to the monitored service circuits.

In addition, the main CPU 7 may be designed to control the switching means to execute the system shutdown following the sending by the auxiliary CPU 8 of an error signal, so as to increase the overall safety level of the switch 1.

For safety reasons, the control means 6 comprise two main CPUs 7, 15 which are at least partly redundant in their respective safety functions and organized according to a master/slave architecture.

Generally, the auxiliary CPU 8 will be connected only to the main CPU 7 with the master function.

The two main CPUs 7, 15 are connected to the control circuits of the system by means of respective communication channels 9, 10, 11 for the independent check of the safety conditions of the system.

Furthermore, the two main CPUs 7, 15 are mutually connected for mutual control of correct operation.

The methods of connection and dialogue between the two main CPUs 7, 15 and of the same ones with the switching means are not indicative of the scope of the present invention and therefore will not be described in detail.

In an indicative manner, the two main CPUs 7, 15 may operate in a similar manner to that described in the aforementioned EP2748926.

According to the configuration of the figures, preferred but not exclusive, the driving device 3 is adapted to interact with the switching means at the opening/closing of the access A for opening/closing one or more circuits of the machine or plant.

In particular, the switch 1 is of the electronically actuated type, i.e. the interaction between the driving device 3 and the switching means will be controlled by an electronic signal transmitted to the switching means by the driving device 3 when the latter is at a minimum distance predetermined by the switching device 2 such that it is possible to consider access A closed and in a safe condition.

For this purpose, the switching device 2 houses a receiver 16, for example an antenna of the RFID type, inserted inside the case 4 and designed to receive a remote control signal, or a presence signal, transmitted by a transmitter or transponder, not visible since it is housed in the mobile driving device 3, when the latter is at the minimum distance detectable by the switching device 2.

In particular, the transponder will be provided with a tag with identification code that will be received by the receiver 16 and be recognized by the main CPU 7 in order to allow the machine or system to start up.

The recognition of the code may be univocal or generic, depending on whether you want to make a switch with a high or low level of coding.

The coded signal thus detected will be sent to the main master CPU 7 for comparison with a code stored thereinto and for authorizing the start of the system in case of recognition of the received identification code and its correspondence with the stored code.

The slave CPU 15 will instead carry out an analysis of the clock signal coming from the receiver 16.

Typically for this kind of switch, the case 4 will also house an unlocking mechanism 17 adapted to move from a blocking position of the access A to a release position to which the opening of the switching means corresponds, allowing the opening of access A only when the switching means are open.

In particular, the unlocking mechanism 17 comprises an unlocking pin 18 adapted to move between the two locking and releasing positions and which is associated with an electromagnet 19 controlled by the same main CPUs 7, 15 upon receipt of the opening signal of the access A.

According to a particular variant, an emergency control may also be provided, such as a mushroom pushbutton, a key selector or similar control adapted to mechanically intervene on the unlocking mechanism to promote translation of the pin towards the release position.

Each main CPU 7, 15 will comprise a communication channel 20 adapted to send to the auxiliary CPU 8 a signal relating to the condition for switching the system on or off.

According to a further aspect of the invention, the auxiliary CPU 8 comprises a memory portion 21 for storing data relating to the operation of the monitored circuits.

Furthermore, the auxiliary CPU will also be associated with an accumulator 22 connected to charging means 23 which can be activated when the system is turned off.

By way of example, the accumulator 22 may be a condenser, while the charging means 23 may comprise a diode able to charge the accumulator 22 with a charge sufficient for the auxiliary CPU 8 to perform a backup of the operating data inside of the memory portion 21 upon reception of the switching off signal.

From above, it is clear that the switch according to the invention achieves the intended objects and in particular that of avoiding having to submit the CPU assigned to the safety checks to a new certification even after reprogramming related to functions not correlated with safety.

The switch according to the invention is susceptible of numerous modifications and variations, all of which are within the inventive concept expressed in the appended claims. All the details may be replaced by other technically equivalent elements, and the materials may be different according to requirements, without departing from the scope of protection of the present invention.

Even though the switch has been described with particular reference to the attached figures, the reference numbers used in the description and claims are used to improve the intelligence of the invention and do not constitute any limitation to the claimed scope of protection.

The invention claimed is:

1. A safety switch with differentiated central processing units (CPUs) for controlling a security access of a machine or industrial system, comprising:
   a switching device adapted to be associated with a fixed part of an access to be controlled and having switching means adapted to be operatively connected to one or more control and/or service circuits of the system for the opening/closing thereof;
   a driving device associated to a movable part of the access to interact with said switching means at the opening/closing of the access for opening/closing of one or more of said circuits; and
   control means associated with said switching device and adapted to receive input signals from said control and/or service circuits through respective communication buses to verify the proper operation and to control said switching means for sending an error signal and/or for stopping the system in case of no signal or detection of non-compliance,
   wherein said control means comprise at least a main CPU operatively connected with the communication buses associated with the safety functions of the system,
   wherein said control means comprise at least one auxiliary CPU operatively connected solely to the communication buses associated with service circuits and/or service devices not related to safety functions related to safety conditions of the system,
   wherein said control means comprise two main CPUs at least partially redundant therebetween in their respective safety functions and mutually connected for mutually controlling of their correct operation, said main CPUs being organized according to a master/slave scheme,
   wherein said two main CPUs are connected to the control circuits of the system by means of respective communication channels for the independent check of the safety conditions of the system and are mutually connected for mutual control of correct operation, and
   wherein said at least one auxiliary CPU is connected only to the main CPU with the master function.

2. The safety switch as claimed in claim 1, wherein said auxiliary CPU is connected to said main CPU with the master function to send thereto information related to the monitored service circuits and/or service devices.

3. The safety switch as claimed in claim 2, wherein said main CPU with the master function is adapted to control said switching means to operate the stop of the system following the sending of an error signal by said auxiliary CPU.

4. The safety switch as claimed in claim 1, wherein said auxiliary CPU comprises a memory portion for storing data relating to the operation of the monitored circuits and/or devices.

5. The safety switch as claimed in claim 4, wherein said auxiliary CPU is associated to an accumulator connected to charging means activated by said control means upon the switching off of the system.

6. The safety switch as claimed in claim 5, where said charging means comprise a diode adapted to charge said accumulator with a charge sufficient for said auxiliary CPU to operate a backup in said memory portion.

7. The safety switch as claimed in claim 1, wherein said driving device comprises drive means adapted to remotely interact with said switching means at the time of the opening/closing of the access (A) for the opening/closing of one or more of said circuits.

8. The safety switch as claimed in claim 7, wherein said operating device comprises a transmitter or transponder adapted to send an identification code to said switching means, these latter being connected to a receiver or antenna adapted to receive said signal and to send said identification code to said main CPU with the master function for comparison with a code stored thereinto, said main CPU with the master function being adapted to authorize the starting of the system upon recognition of said identification code.

\* \* \* \* \*